United States Patent
Venables et al.

(10) Patent No.: US 10,625,831 B2
(45) Date of Patent: Apr. 21, 2020

(54) FIN STABILIZER

(71) Applicants: John D. Venables, Monroe, CT (US); Steven J. Venables, Monroe, CT (US); Cameron Costen, Milford, CT (US)

(72) Inventors: John D. Venables, Monroe, CT (US); Steven J. Venables, Monroe, CT (US); Cameron Costen, Milford, CT (US)

(73) Assignee: Naiad Maritime Group, Inc., Shelton, CT (US)

( * ) Notice: Subject to any disclaimer, the term of this patent is extended or adjusted under 35 U.S.C. 154(b) by 301 days.

(21) Appl. No.: 15/843,446

(22) Filed: Dec. 15, 2017

(65) Prior Publication Data

US 2019/0185115 A1  Jun. 20, 2019

(51) Int. Cl.
*B63B 39/06* (2006.01)
*B63J 99/00* (2009.01)

(52) U.S. Cl.
CPC .............. *B63B 39/06* (2013.01); *B63J 99/00* (2013.01); *B63B 2039/065* (2013.01); *B63J 2099/006* (2013.01)

(58) Field of Classification Search
CPC ..... B63B 39/06; B63B 2039/065; B63J 99/00
See application file for complete search history.

(56) References Cited

U.S. PATENT DOCUMENTS

| | | | |
|---|---|---|---|
| 2,878,772 A | 3/1959 | Kjekstad | |
| 2,937,608 A | 5/1960 | Vandersteel | |
| 3,687,100 A * | 8/1972 | Larsh | G05D 1/0875 114/126 |
| 3,924,555 A * | 12/1975 | Napolitano | B63B 39/06 114/126 |
| 4,273,063 A * | 6/1981 | Berne | B63B 39/06 114/126 |
| 6,453,836 B1 * | 9/2002 | Ditmore | B63B 39/06 114/136 |
| 9,944,363 B2 * | 4/2018 | Venables | G05D 1/0875 |
| 9,994,291 B2 * | 6/2018 | Scott | B63B 39/06 |
| 2008/0141921 A1 * | 6/2008 | Hinderks | B63B 1/28 114/274 |
| 2008/0257245 A1 * | 10/2008 | Stella | B63B 39/06 114/126 |

(Continued)

*Primary Examiner* — S. Joseph Morano
*Assistant Examiner* — Jovon E Hayes
(74) *Attorney, Agent, or Firm* — St. Onge Steward Johnston & Reens, LLC

(57) ABSTRACT

A vessel hull stabilization system includes a housing having a rotatable shaft mounted thereto, the shaft configured to connect to a fin such that the fin is located on an outside of the vessel hull and the housing is located on an inside of the vessel hull. A drive system is mounted to the housing and includes a motor and a drive element. The motor is connected to a central shaft of the drive element and an outer element of the drive element is connected to the fin shaft. The drive element includes a plurality of teeth positioned between the outer element and the central shaft such that when the motor rotates the central shaft, the plurality of teeth oscillate in a direction perpendicular to an axis of the central shaft to interact with and rotate the outer element. A controller receives sensor readings to determine control signals to send to the motor(s) to impart rotation of the fin.

30 Claims, 10 Drawing Sheets

(56) References Cited

U.S. PATENT DOCUMENTS

| | | | |
|---|---|---|---|
| 2009/0205451 A1* | 8/2009 | Bayer | F16H 25/06 |
| | | | 74/325 |
| 2010/0083887 A1* | 4/2010 | Cappiello | B63B 39/061 |
| | | | 114/126 |
| 2015/0096436 A1 | 4/2015 | Venables et al. | |
| 2016/0121978 A1* | 5/2016 | Venables | G05D 1/0875 |
| | | | 701/21 |
| 2016/0288885 A1* | 10/2016 | Scott | B63B 39/06 |
| 2019/0185115 A1* | 6/2019 | Venables | B63B 39/06 |

* cited by examiner

FIN STABILIZER

FIELD OF THE INVENTION

The invention relates to stabilizers and control systems for stabilizers that are used for marine vessels both when making headway and at rest (e.g. at anchor, or zero speed).

BACKGROUND OF THE INVENTION

Fin roll stabilizers are commonly mounted to the hull of a vessel below the waterline, usually within the middle one third of the vessel's waterline length and close to the turn of the bilge. These fins typically rotate about an axis that is perpendicular to the lengthwise axis of the vessel. The stabilizer fins are generally aligned parallel to the lengthwise axis of the vessel and rotation of these fins reduces roll of the vessel. The fin roll stabilizers act in some ways that are similar to ailerons on an airplane.

Many traditional fin roll stabilizers for marine vessels are powered hydraulically. In order to create a functioning stabilizing system, a complex setup of hydraulic plumbing, valves, cylinders and pumps are needed to operate and control the stabilizer. In addition, a reservoir must be provided to supply the pumps with hydraulic fluid and a cooling system and filter is needed to prevent overheating and to keep the fluid clean. The hydraulic system components all need connection with hose or pipe which can run long distances within a vessel and can be difficult to install and require maintenance.

Electrical sensors and controls are then needed to operate various valves within the hydraulic system to allow the stabilizer fins to move through varying degrees of rotation that depend on vessel speed and wave conditions that are causing the vessel to roll.

The hydraulic system also comes with added environmental concerns associated with hydraulic oil because a leak in the system can bleed into the bilge of the vessel and be pumped out with bilge water into the ocean or other body of water where the marine vessel is operating.

The hydraulic fluid is often put under high pressure such that the associated parts within the system must be designed to withstand that substantial pressure. In addition, air in the hydraulic system can cause control problems and when the air bubbles collapse they generate intense localized heat in the hydraulic oil leading to system overheating and early hydraulic component failure. Air in the system can also cause objectionable noise and vibration transmitted throughout the vessel via the interconnecting hydraulic piping. Routine maintenance or servicing of an otherwise closed hydraulic system, such as changing a hose or a valve, can easily introduce debris or contaminants that can cause intermittent problems that are very difficult to diagnose, require complete system flushing and can lead to expensive repairs.

Another concern of a shipboard hydraulic system is fire. At higher pressures the hydraulic system is more prone to leaks and when a leak occurs the oil can mist or spray onto hot surfaces in the vessel's machinery spaces or be vaporized, and when exposed to a source of ignition vaporized oil causes fire.

An alternative to hydraulics has been direct drive electric motors that rotate the fin shaft via a planetary gear set. However, planetary gear arrangements are prone to backlash and positioning errors, and those errors increase as the gears experience wear. Strain wave gear sets eliminate backlash, but are less efficient, are limited in torque capacity and are prone to ratcheting phenomenon in momentary peak conditions (this condition is called dedoidal and can damage the drive).

SUMMARY OF THE INVENTION

Therefore, it is an object of the invention to provide an oscillating separate individual sliding tooth drive system using a logarithmic spiral that allows power to be transmitted by multiple teeth in surface contact for the purpose of rotating a stabilization fin with improved torque control and reduced or zero backlash.

It is a further object of the invention to provide for flexible placement and orientation of motor and drive elements to provide for the ability to fit in small spaces, to provide improved access for repair/adjustment.

It is a further object of the invention to allow for use of standardized and interchangeable components to allow for the number of motors which make up the stabilizer to be changed to accommodate varied fin and torque requirements.

These and other objects are achieved by providing a vessel stabilization system including a housing having a rotatable fin shaft mounted thereto, the fin shaft configured to connect to a fin such that the fin is located outside of the vessel hull below the waterline and the housing is located inside of the vessel hull. A drive system is directly or indirectly mounted to the housing and includes a motor and a drive element. The system may also include gearing between the motor and drive element, and/or gearing between the drive element and the fin shaft. The motor is directly or indirectly connected to a central shaft of the drive element and an outer element of the drive element is connected to the fin shaft. The drive element includes a plurality of teeth positioned between the outer element and the central shaft such that when the motor rotates the central shaft, the plurality of teeth oscillate in a direction perpendicular to an axis of the central shaft to interact with and rotate the outer element.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, components, systems or subsystems constituting any one or more of (a) a connection, whether direct or through one or more other devices, apparatus, components, systems or subsystems, and/or (b) a functional relationship in which the operation of any one or more devices, components, systems or subsystems, in whole or in part, on the operation of any one or more others thereof.

In certain aspects each drive unit assembly includes a plurality of drive systems each mounted to said housing wherein the motor extends outwardly relative to the central shaft at an angle normal to without intersecting the axis of the central shaft. In still other aspects the plurality of drive systems are configured to be mounted to said housing such that each drive system is configured to be positioned so that the angle of the motor is adjustable to at least two different positions in certain embodiments, these two different positions are at least 90 degrees apart.

In certain aspects a vessel hull stabilization system is provided including a housing having a shaft mounted thereto, the shaft configured to connect to a fin such that the fin is located on an outside of the vessel hull and the housing is located on an inside of the vessel hull. A drive system is mounted to the housing and includes a motor and a drive element, the motor is connected to a central rotating element of the drive element and an outer rotating element of the drive element is connected to the shaft. The drive element includes a plurality of teeth positioned between the outer rotating element and the central rotating element such that when the motor rotates the central rotating element, the plurality of teeth oscillate in a direction perpendicular to an axis about which the central rotating element rotates to thereby cause rotation of the outer element.

In some aspects the drive system includes multiple drive systems each mounted to the housing so that the motor extends outwardly relative to the central shaft at an angle normal to without intersecting the axis of the central shaft. In certain aspects the drive system includes multiple drive systems each mounted to the housing, where the motor of each drive system extends parallel to the axis. In certain aspects the drive systems are configured to be mounted to the housing such that each drive system is configured to be positioned so that the angle of the motor is adjustable to at least two different positions at least 90 degrees apart. In other aspects the drive systems are configured to be mounted to the housing such that each drive system is configured to be positioned so that the angle of the motor is adjustable to at least two different positions which are adjacent and range from 5 to 20 degrees apart. In other aspects the two different positions are 8-14 degrees apart. In certain aspects the at least two different positions include at least ten different positions. In other aspects, the drive systems are configured to be mounted to the housing such that each drive system is configured to be positioned so that the angle of the motor is adjustable to at least four different positions. In other aspects, the drive systems are configured to be mounted to said housing such that each drive system is configured to be positioned so that the angle of the motor is adjustable to at least six different positions. In other aspects, the angle of the motor adjustable to at least eight different positions.

In certain aspects, the outer rotating element of the drive element is connected directly to the shaft such that the fin and the outer rotating element rotate at the same angular velocity. In still other aspects, the outer rotating element of the drive element has a first gear connected thereto which meshes with a second gear connected to the shaft. In other aspects, the second gear has less than 180 degrees of teeth.

In other aspects, the system is provided with a plurality of plates which connect to the housing, at least a first one of the plates is a first plate and includes a central hole and a plurality of radial holes. In still other aspects, the drive element is configured to connect to the first one of the plurality of plates at the plurality of radial holes such that an element which is caused to rotate by the motor passes through the central hole.

In still other aspects, at least two first ones of the plurality of plates and the drive system comprise two drive systems, each with a drive element and motor, each one of said two drive systems connected to one of the first plates.

In other aspects, a vessel hull stabilization system is provided and includes a housing having a shaft mounted thereto, the shaft configured to connect to a fin such that the fin is located on an outside of the vessel hull and the housing is located on an inside of the vessel hull. A drive system is mounted to the housing and includes a motor and a drive element, the motor connected to a central rotating element of the drive element and an outer rotating element of the drive element connected directly to the shaft such that the fin and the outer rotating element rotate at the same angular velocity. The drive element further includes teeth positioned between the outer rotating element and the central rotating element such that when the motor rotates the central rotating element, the plurality of teeth oscillate in a direction perpendicular to an axis about which the central rotating element rotates to thereby cause rotation of the outer element.

In certain aspects, the motor includes a rotating element which connects to the central rotating element, the rotating element of the motor rotates about the axis. In other aspects, the motor includes a rotating element which connects to the central rotating element, the rotating element of the motor rotates about a second axis normal to the axis.

In yet other aspects a stabilization system for a vessel is provided with a housing having a shaft mounted thereto, the shaft configured to connect to a fin such that the fin is located on an outside of the vessel hull and the housing is located on an inside of the vessel hull. Multiple plates are provided and at least a first and second which include an inner hole and a plurality of outer holes radially around the inner hole. At least two drive systems are included and each have a motor and drive element, the drive element configured to connect to the shaft through the inner hole in one of the plurality of plates. The drive element is connected to its corresponding one of the plurality of plates such that it is removable and rotatable about the central hole in at least two positions which are at least 5 degrees apart. In certain aspects the multiple plates includes at least one plate without inner and outer holes therein. In certain aspects the plates are removably connected to the housing. In certain aspects the plates are each repositionable on the housing and relative to others of said plurality of plates. In other aspects the drive element includes a first gear and the shaft includes a second gear which meshes with the first gear to transfer torque from the motor to the shaft.

The stabilization systems may include at least one sensor and at least one controller in communication with the motor(s) and the at least one sensor, the at least one controller sends signals to the motor(s) to change a position of the fin based on readings from the at least one sensor.

In certain aspects, the shaft has a diameter measured at a first location where the shaft meets the housing and the system has a height measured from the first location to a maximum inboard location thereof, the shaft extending outboard from the housing from the first location. The height may be 2-20, 3-15 3.5-10 and/or 4-7 times the diameter. In other aspects upper and lower bearings are located in the housing such that the shaft is supported by the upper and lower bearings, the lower bearing positioned closer to a first location where the shaft meets the housing than the upper bearing, a bearing spacing measured between the upper and lower bearings. The height may be 1.05-8, 1.1-6, 1.2-5 and/or 1.05-3 times the bearing spacing.

Other objects of the invention and its particular features and advantages will become more apparent from consideration of the following drawings and accompanying detailed description.

DETAILED DESCRIPTION OF THE INVENTION

Figure 1:
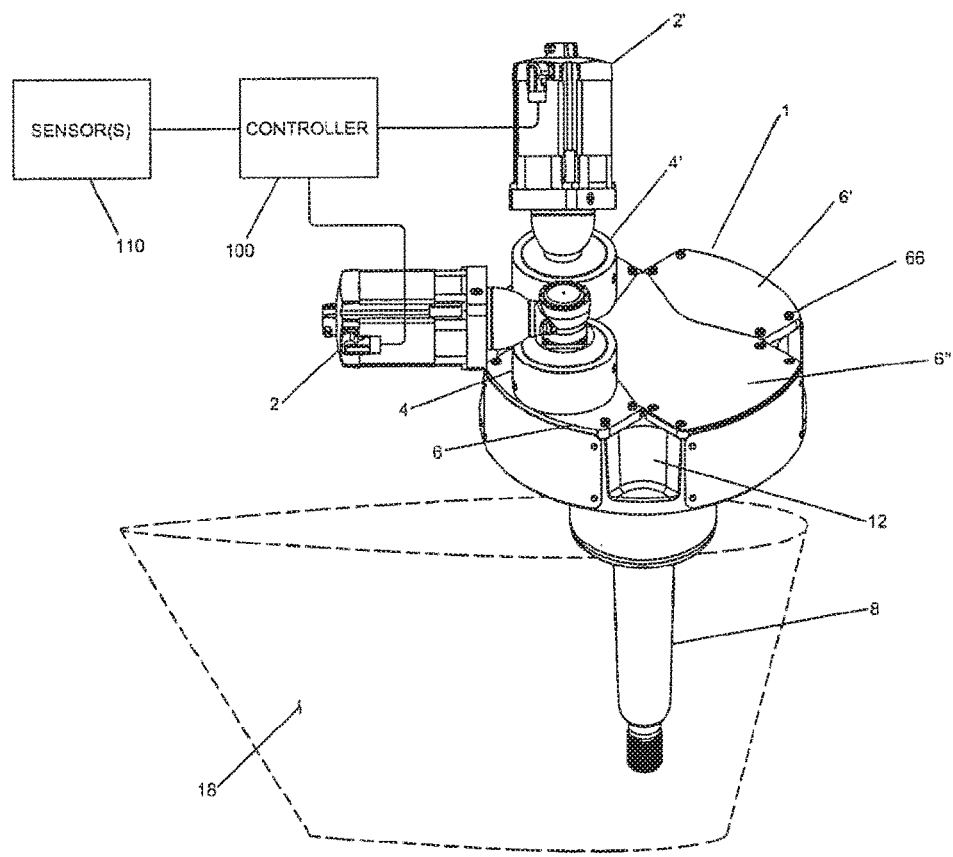
FIG. 1 is a perspective view of a drive unit assembly for a fin stabilizer according to an embodiment of the present invention

Referring now to the drawings, wherein like reference numerals designate corresponding structure throughout the views. The following examples are presented to further illustrate and explain the present invention and should not be taken as limiting in any regard.

FIG. 1 shows an example drive unit assembly 1 for a fin stabilizer which employs the oscillating tooth based drive system 4, 4' to drive the shaft 8 which rotates the fin 18 attached thereto. An example fin that attached to a shaft similar to that shown in FIG. 1 is also shown and described in U.S. Pat Pub No 2016/0121978, the content of which is incorporated by reference herein. It is understood that other drive elements made gears and other transmission devices may be employed in connection with this system. As shown, the drive unit assembly 1 is connected to a controller 100 which receives sensor data from sensor(s) 110 to determine what stabilizing commands are necessary based on the conditions and movement of the ship. Commands are communicated to the motors 2, 2' to change a position of the fin 18 to thereby enhance stability of or adjust the position of the vessel. For example, to counteract roll.

FIG. 1 provides two motors 2,2' which respectively operate an oscillating tooth based drive element. An example oscillating tooth based drive element is shown and described in U.S. Pat. Pub. No. 2009/0205451, the content of which is incorporated by reference herein.

Therefore, motor 2 is coupled to an internal shaft or central rotating element of the drive element 4 which rotates to thereby drive the oscillating motion of the teeth which causes an element outwards of the central element to rotate. In certain embodiments a gear 14 extends below plate 6 and within housing 12. The gear 14 interlocks with a second gear 16 which is connected to shaft 8, and also positioned in the housing 12.

Figure 9:
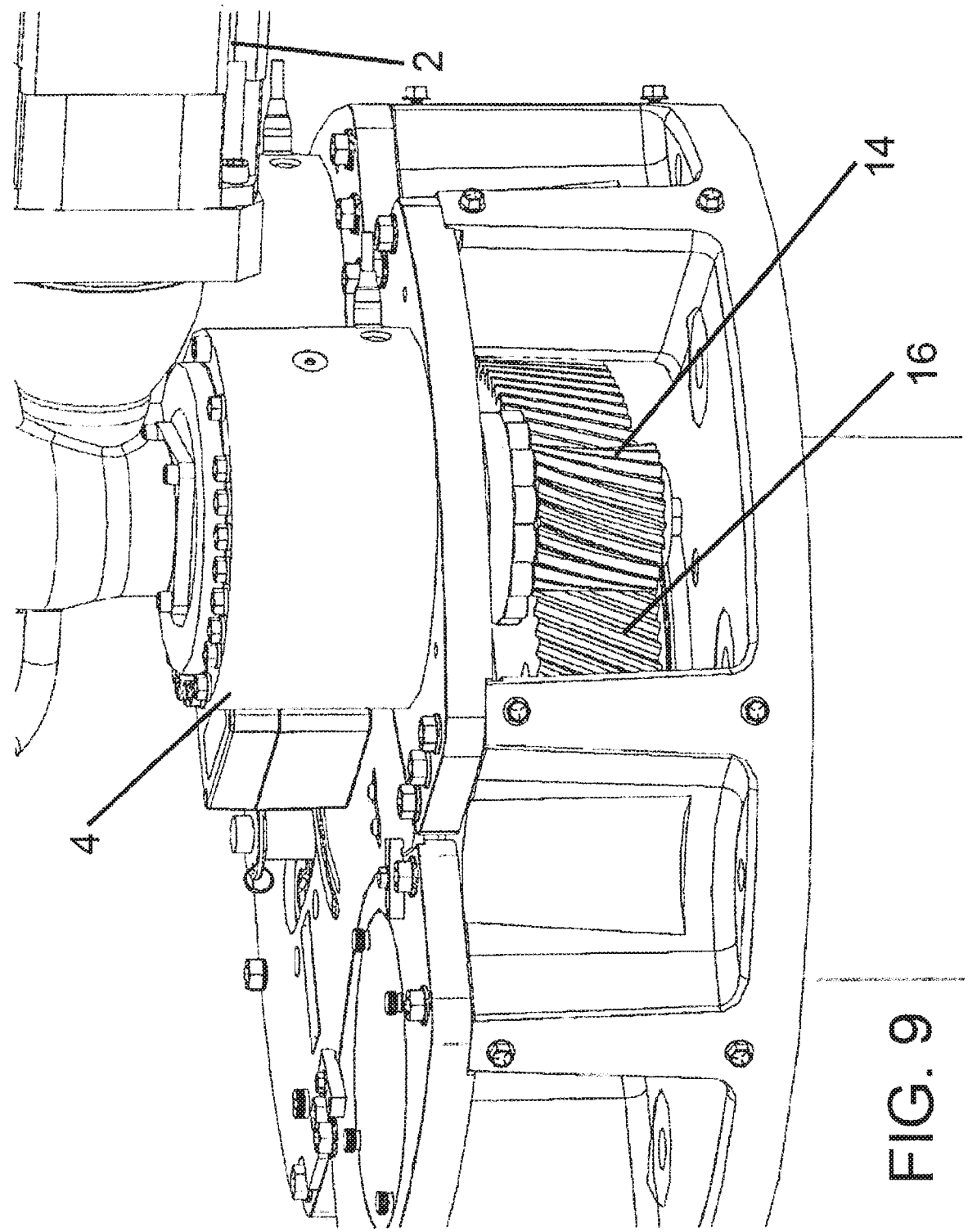
FIG. 9 is side perspective view of the drive unit assembly of FIG. 1.
Figure 12:
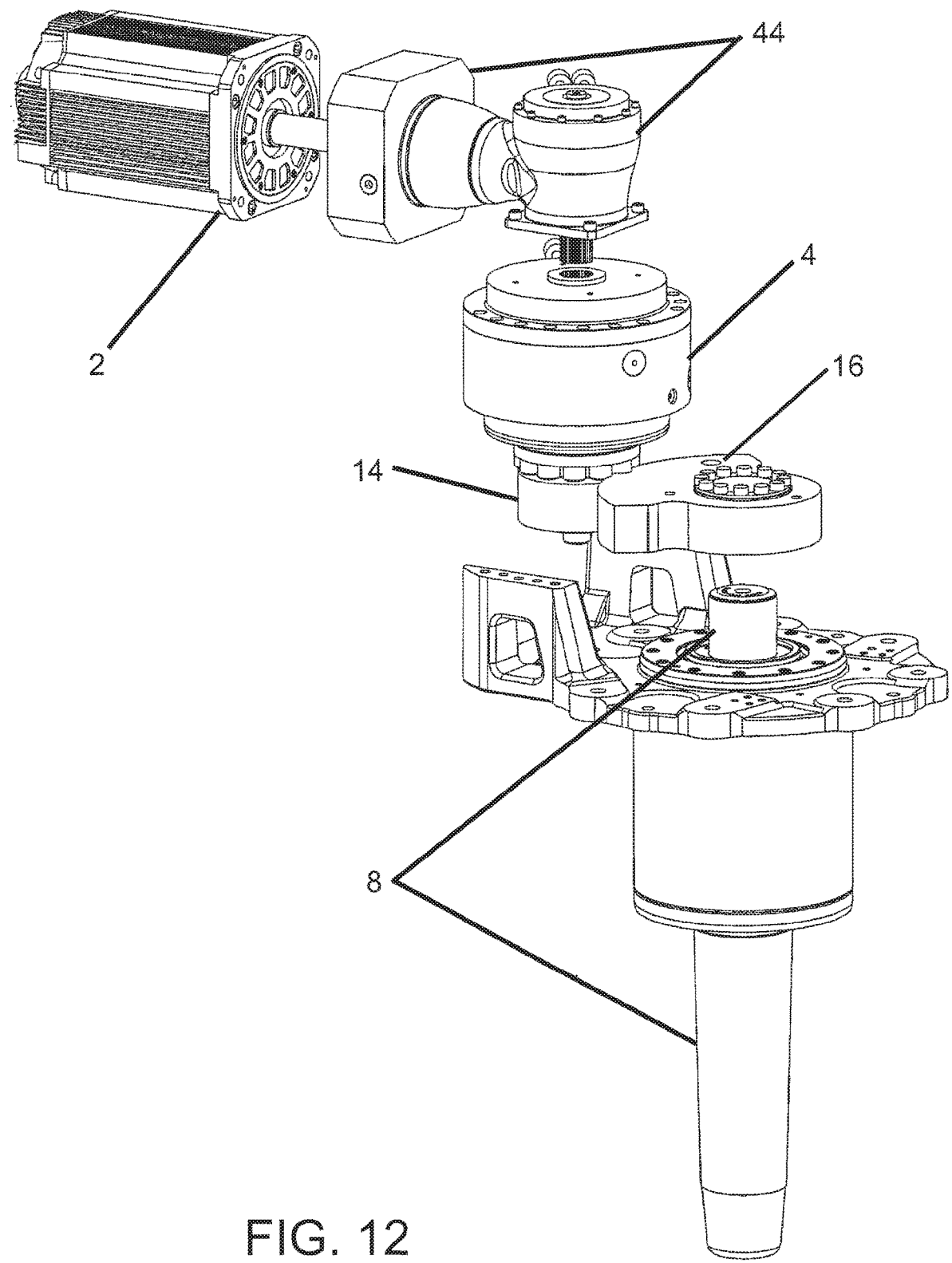
FIG. 12 is a perspective exploded view of a single drive system.
Figure 13A:
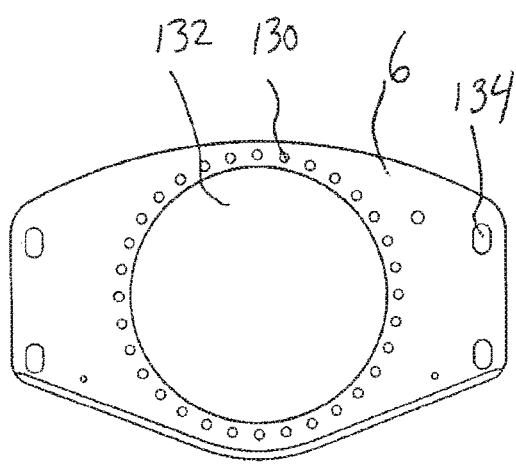
FIGS. 13A-B show top and perspective views a component of the devices of FIGS. 1-12 where the drive assembly attaches to the stabilizer.
Figure 13B:
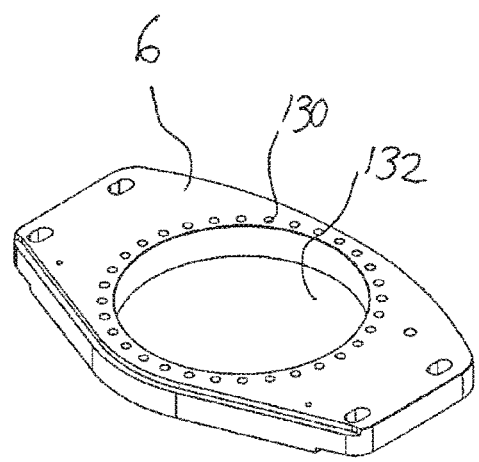

FIG. 9 shows one example of the gear 14 and the second gear 16 connected to the shaft 8. The drive element 4 and motor 2 are not included in the drawing of FIG. 9. FIG. 12 shows additional detail on the second gear 16 in that in the single motor embodiment, this gear may only include teeth around about 120 degrees to enable a corresponding amount of angular position travel of the fin. In the embodiment where multiple motors are used, it would be understood that the second gear 16 may extend around the entire 360 degrees such that the additional motors and their gears 14 can mesh with gear 16 to turn the fin 18.

Figure 2:
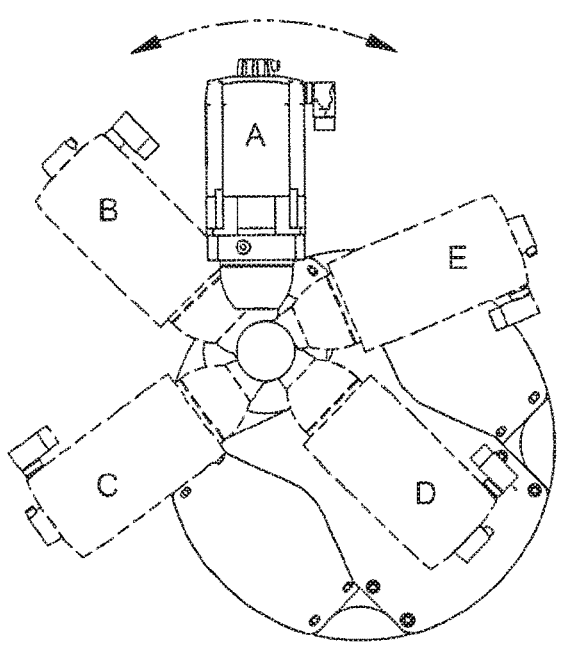
FIG. 2 is a top view of FIG. 1.
Figure 3:
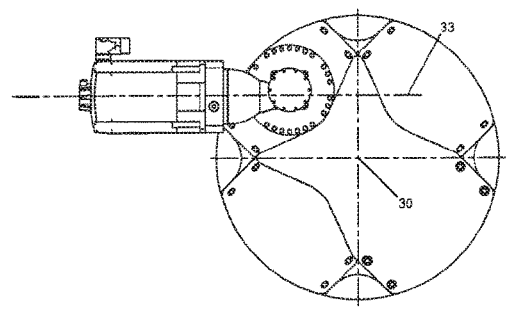
FIGS. 3-8 are top views of FIG. 1 in alternate configurations of the drive system(s) in various mounting locations and orientations.
Figure 4:
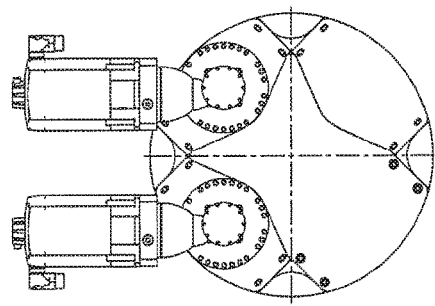
Figure 5:
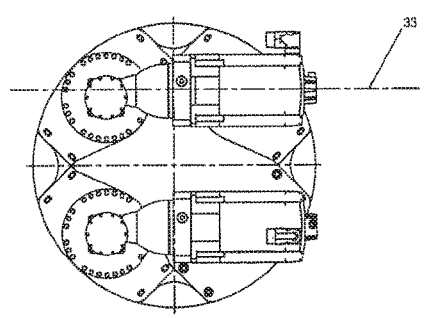
Figure 6:
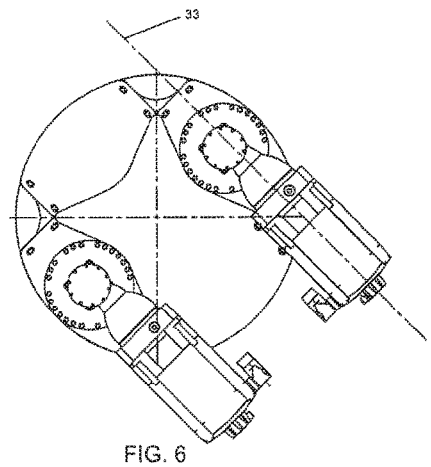
Figure 7:
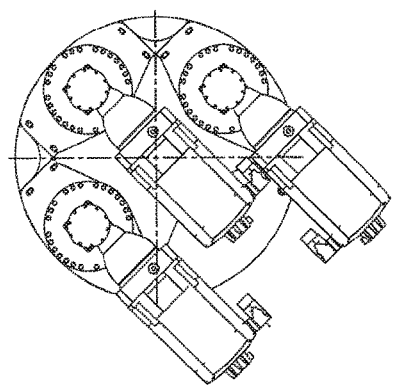
Figure 8:
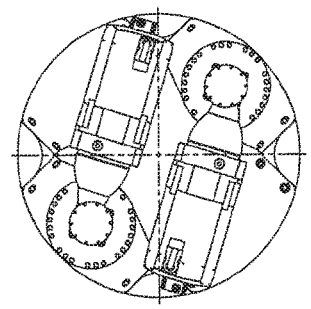

As shown in FIG. 2, the drive system can be positioned at a wide range of angles relative to the housing and additional drive systems can be mounted to the housing 12 to increase the torque capabilities such that a single housing can be used for different fin sizes. Positions A-E are but some examples of how the motor can be positioned.

In certain instances a larger fin could be used an may require more torque to rotate and thus need more drive systems whereas a smaller fin would require less torque and thus fewer drive systems. Depending on the drive system mounting location on the housing and clearance as to other items in the ship, the drive system would be positioned to allow for appropriate clearances between other ship parts. In other aspects, the position may be selected to allow for easy access for repair/maintenance. A variety of position options are shown at FIGS. 3-8 but it is understood that the positions shown are not exhaustive of all options to position the drive systems as the positions may be mixed and matched as appropriate for the particular vessel. For example axis 33 can be positioned such that the motor is to the right of the attachment point (FIG. 5), to the left of the attachment point (FIG. 3) or at a variety of angles between these locations around a 360 degree reference. Furthermore, different configurations of the securing plates 6, 6' etc are shown in FIGS. 3-8. Notably, FIG. 3 has one plate 6 whereas FIG. 6 has two plates 6 but they are positioned in different locations relative to the stabilizer. Generally, the housing 12 will be mounted to the hull in a specific orientation, generally so the fin is parallel to the direction of travel of the vessel in the neutral position. Then, the use of three or optionally four different motor configurations and locations are used to assemble the plates to locate the motors as desired. Plate 6" is used to cover the center area of the housing and one of the outer locations where a motor could go, but due to the layout of the housing and the bolts and bolt holes which connect the plates 6, 6' and 6" to the housing, the plates can be assembled in a variety of different configurations to enable customized placement of motors, depending on the specific application. As shown, plates 6, 6' and 6" can be connected to the housing with bolts 66 or screws or the like.

The motor in each instance shown in FIGS. 3-8 extends at a direction generally perpendicular or normal to the fin axle/shaft (axis 30) and the angle of this direction can be adjusted depending on how the vessel is configured and what the space/access requirements are. It is also understood that in the multiple motor configuration, one or more motors may be positioned such that they extend such that the rotating element of the motor is generally parallel to the fin axle/shaft (i.e. out of the page). It is understood that motors may be mixed and matched in perpendicular and parallel configurations, depending on the requirements of the vessel, space constraints and other considerations. It is also understood that the motor orientation where the motor axis 33 is parallel to axis 30 can be used. For example, see FIG. 1, motor 2' and drive element 4'. It is understood that different motor configurations can be mixed and matched and positioned and directed in a variety of ways to account for space and other constraints for the system.

Figure 10:
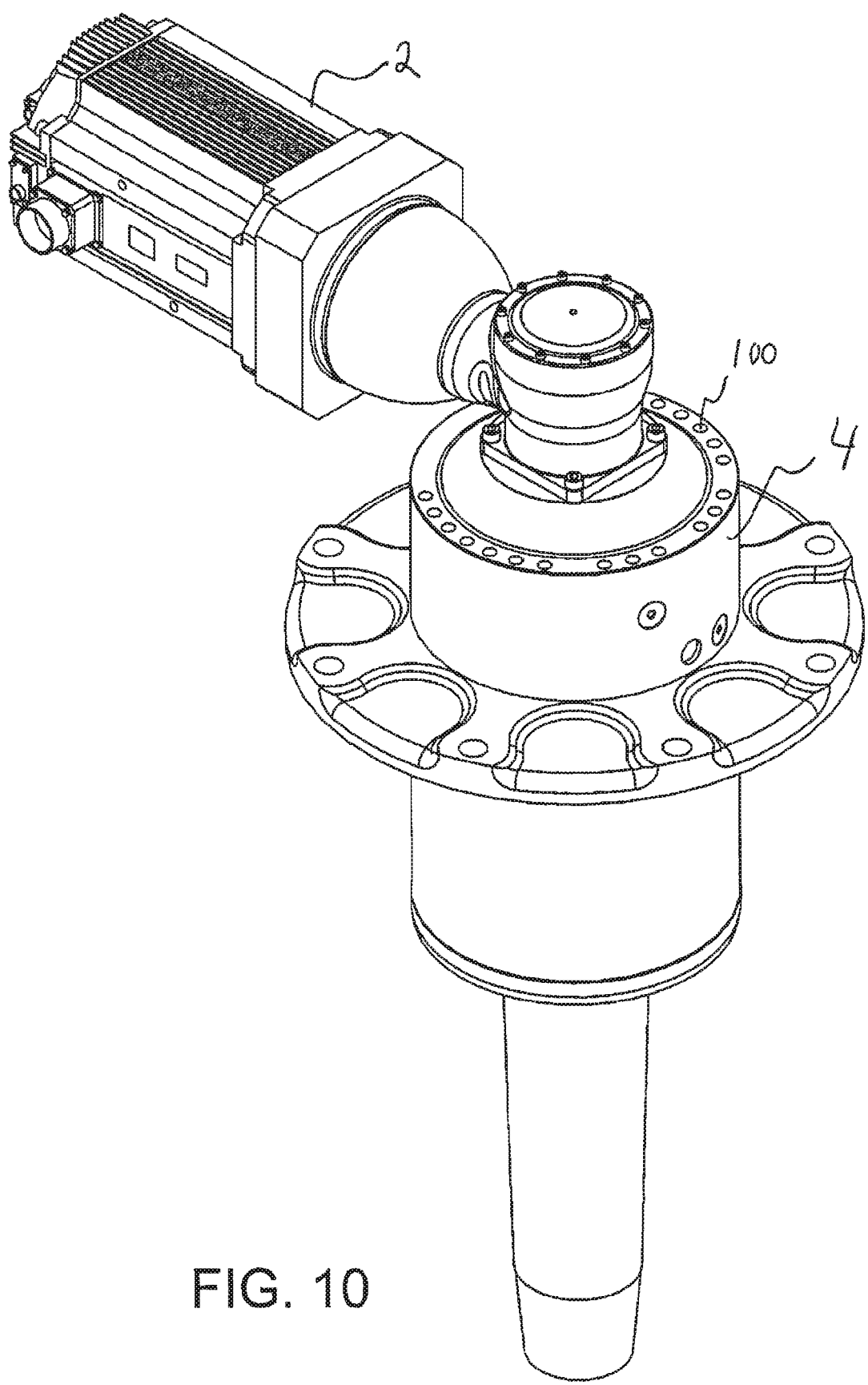
FIG. 10 is a perspective view of a drive system directly connected to the fin shaft with an optional right angle gear box.
Figure 11:
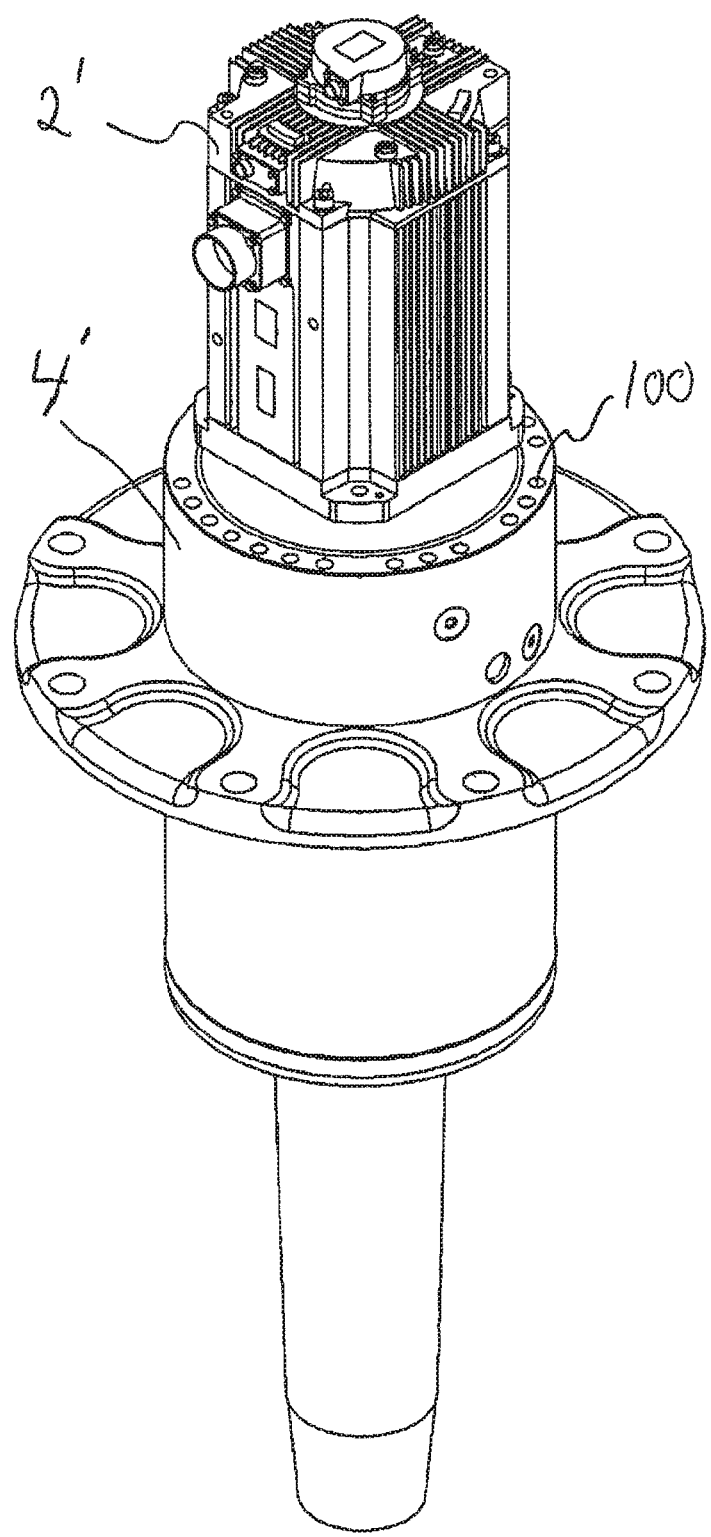
FIG. 11 is a perspective view of a drive system directly connected to the fin shaft.

FIG. 10 provides a direct drive system where gear 14 and second gear 16 are not used. FIG. 11 provides a drive system where the motor is mounted directly to the drive element. FIG. 12 provides an exploded view of one embodiment of a drive unit assembly. The angled motor element 44 may be two beveled gears with equal numbers of teeth such that no step up/down is accomplished. Alternately, gearing may be used in the angled element 44. Other transmission devices or elements other than gears may be used to accomplish the right angle power transmission features. It is also understood that although perpendicular/normal and parallel motor configurations are shown, the system could implemented with angled elements 44 that are at any angle between 0 and 90 degrees, depending on design requirements and considerations. Typically more than 90 degrees would not be anticipated however, it is understood that angles greater than 90 degrees could be employed for the angle drive element 44.

To enable the motor to be re-positioned at a variety of angles a connector, the housing 12 includes a plate 6 with a plurality of outer holes 130 which may be threaded and positioned around a larger center or inner hole 132. The center hole allows the drive element to connect to the shaft either directly or indirectly via gears or other similar torque transfer devices. The outer holes are arrange radially around the center or inner hole. The outer holes may also be through holes. In the threaded embodiment, a number of bolts 92 pass through holes in the drive element housing 44 to connect to the threaded holes. If the outer holes in the plate 6 are not threated, a combination of nuts/bolts and washers are used. The drive element housing 44 includes a number of bolt holes 100 spaced radially there around such that the bolts 46 may be removed. This would then allow the drive element housing 44 to be rotated to a different position and thus direct the motor in a different direction relative to the shaft axis. The foregoing enables the motors to be positioned in a variety of ways to accommodate tight spaces that the fin stabilizer system often operates in.

As also seen in FIG. 1, the plate 6 may be comprised of a plurality of discreet plates. FIG. 1 shows four plates. Thus, the components of the system from the housing 12 down can be uniform across multiple power and fin sizes/configurations and the plates 6 may be interchanged with different plates to increase/decrease the number of motors used. For example, the specific plate 6 referred to in FIG. 1 includes the center hole and outer holes to enable the drive element 4 to be connected thereto. If FIG. 1 was changed to be a one motor embodiment, the plate 6 could be replaced with plate 6' or to add additional power to the system, plate 6 could be duplicated and the duplicate could replace plate 6' and another motor and drive element could be added to the system. Plates can be removed/replaced via bolts or screws which pass through holes 134.

Figure 14A:
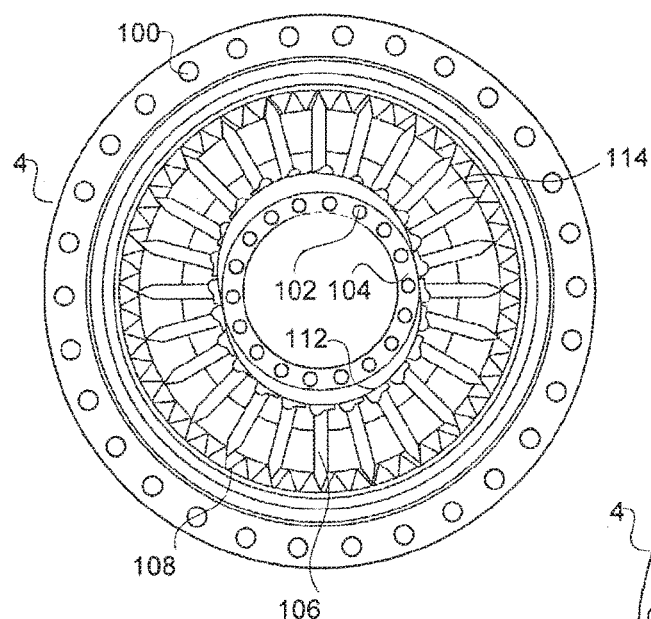
FIGS. 14A-C show one embodiment of a drive element which could be used with respect to FIGS. 1-12.
Figure 14B:
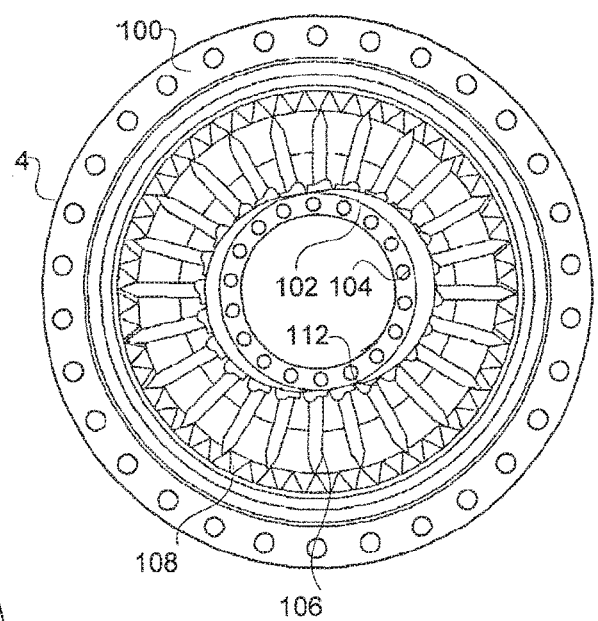
Figure 14C:
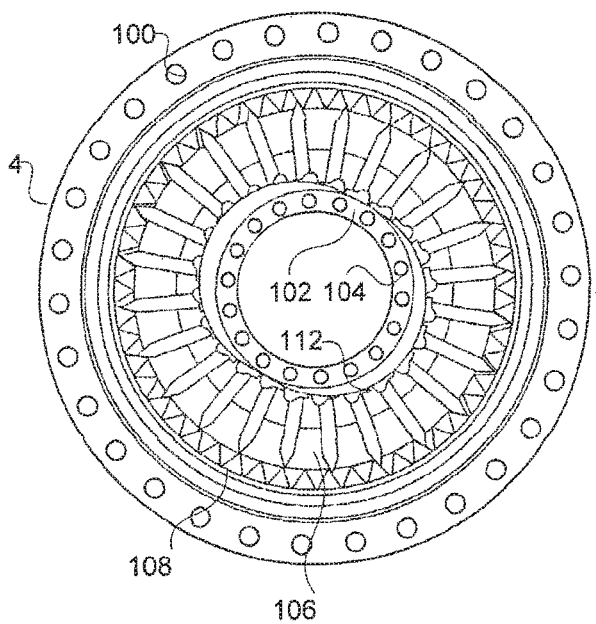

Referring to FIGS. 14A-C, the drive element 4 is shown with its inner workings exposed. The motor is connected to the central element 104 and this connection may be made via bolts through the holes 102. Other connection methodologies can be employed. This center element includes an outer cam surface which in the embodiment shown is generally oval or elliptical in shape. This cam shape as it turns (see 14B and 14C for different positions) causes the teeth 106 to move in and out relative to the central axis. This in turn causes the teeth 106 to progressively step around to different of the outer gear teeth 108. The outer gear teeth 108 are fixed in position relative to the outer housing which includes the securing holes 100. This motion causes the inner ring through which the teeth 106 pass to rotate in a way that provides the gearing advantage required to rotate the fin through water. The ring 114 may generally be a hollow shaft with radial holes which retain the teeth 106. Chain or connection element 112 extends around the cam surface and ensures that the teeth 106 are positioned correctly to enable the inward and outward oscillating motion. As can be seen with respect to FIG. 14A, the top and bottom teeth 106 are in contact with the outer gear element 108 whereas the side teeth are not. In comparison to FIG. 14B, the inner element 104 is rotated about 60 degrees and different teeth are now in contact with outer gear element 108. As can be seen in FIG. 14B, the teeth at approximately vertical is at the tip of the top gear tooth such that the two points align. Other teeth are not centrally aligned at their tips such that when outward motion of the tooth happens, the tip shape tends to cause the tooth and outer gear 108 to align and center, this causes rotational motion of the outer element or ring 114 which is then connected to the fin shaft or other gearing to transmit torque to the fin.

Figure 15:
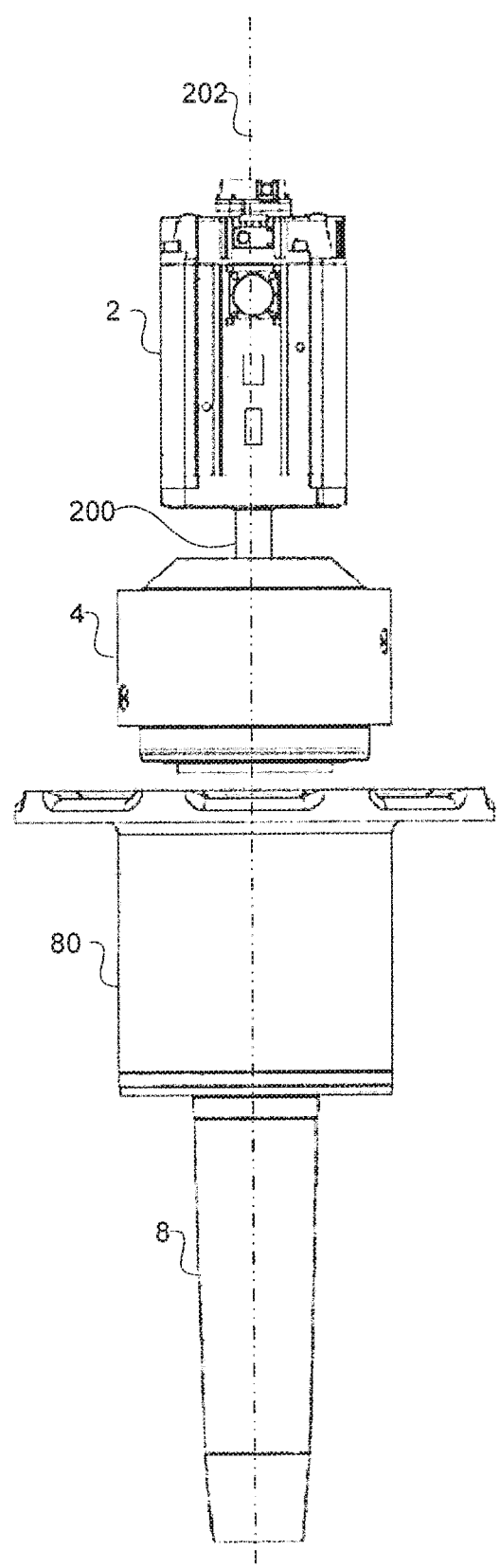
FIG. 15 shows an exploded view of FIG. 11.

As shown in FIG. 15, the motor shaft 200 aligns with the center of the drive element 4 and thus the rotation axis of the inner 104 and outer 114 elements thereof. Further, the shaft 8 for the fin 18 aligns with the motor shaft 200, thus all of the foregoing align such that their rotation axes are co-linear and aligned along the same axis. In the embodiment shown, the shaft 8 rotates at the same rate as the outer element 114 and the motor shaft 200 rotates at the same rate as the inner element 104.

Figure 16:
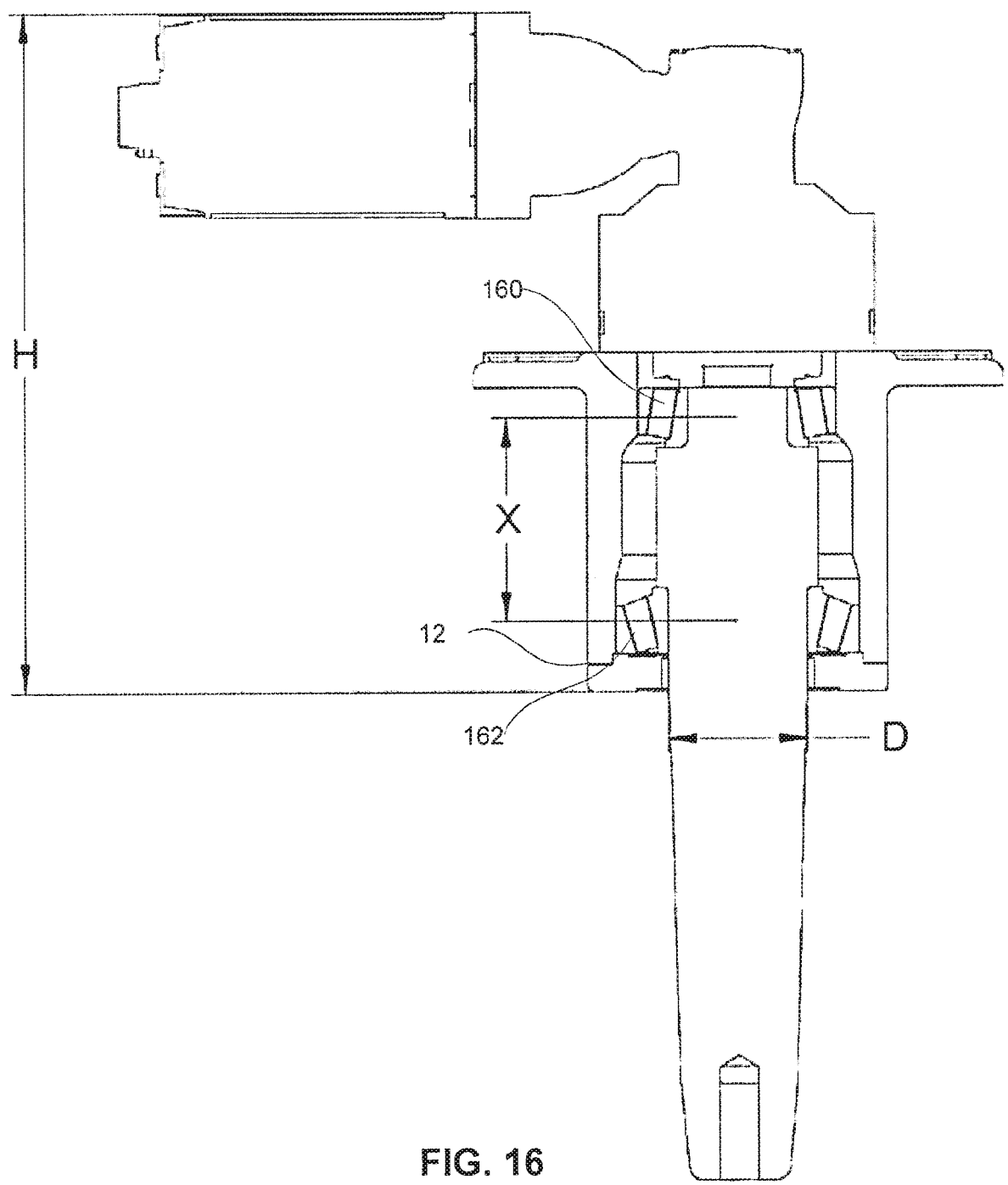
FIG. 16 shows a partial cross section view of FIG. 10.

Referring to FIG. 16, a side partial cross section view of FIG. 10 is shown such that upper 160 and lower 162 bearings can be seen. These bearings are spaced apart at a distance X. The bearings support the forces generated by the fin which often includes significant bending moments due to the lift forces generated by the fin 18 during operation thereof. The internal height H of the stabilizer is also shown between where the shaft 8 and housing 12 meet and the maximum position of the stabilizer unit. It is understood that the bottom point where H is measured from is typically flush with the outer surface of the vessel hull, thus the height H represents the amount the stabilizer extends into the inner areas of the vessel hull. Typically space is a premium in the areas where these stabilizers are positioned, thus a lower profile system is desirable. As can be seen, the drive element 4 and its motor accomplish the mechanical advantage gearing required to move the fin 18 through the water and do so in a relatively thin or small dimension. Typically, as the size of fins 18 increase, the shaft diameter D where the shaft interfaces the bearing housing 80 will need to increase as will the size of the motor and drive element. The bearing spacing X may also need to be adjusted to account for larger or smaller moments and space constraints available. In certain preferred embodiments the ratio of bearing spacing X to height H is 1.05-6:H (i.e. that the height H is 1.05-6 times the bearing spacing X), or more particularly 1.1-5.5:H or even more particularly 1.2-4:H, in certain embodiments 2.5-4:H others 2.0-2.5:H and still others 1.2-2.0:H. As also mentioned, the relationship between the shaft diameter and height provides space constraint advantages. Exemplary ranges of shaft diameter D to height H are 2-20:H (i.e the height is 2-20 times the shaft diameter), more particularly 2.75-15:H or even more particularly 3.5-14:H. Certain preferred embodiments are 4-5:H, 5-6.5:H and 6.5-12:H. It is understood that all modifications and adjustments within these foregoing ratio ranges are contemplated. The height H represents the inboard clearance requirements for installation of the stabilizer, i.e. if the height is 12 inches, the inboard hull space must allow for at least 12 inches in space to accommodate the stabilizer system. It is understood that the controller and sensors and wiring may be considered separate from the height in instances where these elements are located in other parts of the vessel or in the case of wiring when it is connected such that it extends away from the stabilizer but is flexible enough to allow for connection without interference.

It is further understood that any of the foregoing stabilizers may allow for 360 degree rotation of the fin which is particularly useful in certain vessels such as a ferry which operates when underway in a "reverse" direction, meaning, the ferry comes into one dock bow first, off loads and then loads up and then the bow becomes the stern of the boat because the boat moves to its next destination in a manner where the bow is behind it, allowing offloading of cars straight off what was the stern at the previous dock. In this manner, the stabilizer would have two neutral positions about 180 degrees apart, depending on which side of the boat is the "front" in any given operation. Thus, the controller may send signals to the stabilizer to change its neutral position by rotating the stabilizer 180 degrees such that when underway, the leading edge of the fin (right side thereof in FIG. 1) is always facing forward.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A vessel hull stabilizer comprising:
   a housing having a shaft mounted thereto, the shaft configured to connect to a fin such that the fin is located on an outside of the vessel hull and the housing is located on an inside of the vessel hull;
   a drive system mounted to said housing and including a motor and a drive element, the motor connected to a central rotating element of the drive element and an outer rotating element of the drive element connected to the shaft;
   wherein the drive element includes a plurality of teeth positioned between the outer rotating element and the central rotating element such that when the motor rotates the central rotating element, the plurality of teeth oscillate in a direction perpendicular to an axis about which the central rotating element rotates to thereby cause rotation of the outer element.

2. The stabilizer of claim 1 wherein the motor includes a shaft which rotates about a motor axis which aligns with the axis about which the central rotating element rotates.

3. The stabilizer of claim 2 wherein the shaft configured to connect to the fin has a shaft axis which aligns with the motor axis and the axis about which the central rotating element rotates.

4. The stabilizer of claim 1 wherein the shaft rotates at the same rate as the outer element and the motor rotates at the same rate as the central rotating element.

5. The stabilizer of claim 1 wherein the shaft has a diameter measured at a first location where the shaft meets the housing and the stabilizer has a height measured from the first location to a maximum inboard location thereof, the shaft extending outboard from the housing from the first location; and
   the height is 2-20 times the diameter.

6. The stabilizer of claim 5 wherein the height is 3-15 times the diameter.

7. The stabilizer of claim 5 wherein the height is 3.5-10 times the diameter.

8. The stabilizer of claim 5 wherein the height is 4-7 times the diameter.

9. The stabilizer of claim 1 further comprising upper and lower bearings located in the housing such that the shaft is supported by the upper and lower bearings, the lower bearing positioned closer to a first location where the shaft meets the housing than the upper bearing, a bearing spacing measured between the upper and lower bearings and the stabilizer has a height measured from the first location to a maximum inboard location thereof, the shaft extending outboard from the housing from the first location; and
   the height is 1.05-8 times the bearing spacing.

10. The stabilizer of claim 9 wherein the height is 1.1-6 times the bearing spacing.

11. The stabilizer of claim 9 wherein the height is 1.2-5 times the bearing spacing.

12. The stabilizer of claim 9 wherein the height is 1.05-3 times the bearing spacing.

13. The stabilizer of claim 1 wherein the drive system is configured to be mounted to said housing such that the drive system is configured to be positioned so that the angle of the motor is adjustable to at least two different positions at least 90 degrees apart.

14. The stabilizer of claim 1 wherein the outer rotating element of the drive element is connected directly to the shaft such that the fin and the outer rotating element rotate at the same angular velocity.

15. The stabilizer of claim 1 further comprising:
   a plurality of plates which connect to said housing, at least a first one of said plurality of plates is a first plate and includes a central hole and a plurality of radial holes;
   the drive element configured to connect to the first one of said plurality of plates at the plurality of radial holes such that an element which is caused to rotate by the motor passes through the central hole.

16. The stabilizer of claim 1 further comprising:
   at least one sensor;
   at least one controller in communication with the motor and the at least one sensor, the at least one controller sends signals to the motor to change a position of the fin based on readings from the at least one sensor.

17. A vessel hull stabilizer comprising:
   a housing having a shaft mounted thereto, the shaft configured to connect to a fin such that the fin is located on an outside of the vessel hull and the housing is located on an inside of the vessel hull;
   a drive system mounted to said housing and including a motor and a drive element, the motor connected to a central rotating element of the drive element and an outer rotating element of the drive element connected directly to the shaft such that the fin and the outer rotating element rotate at the same angular velocity;
   wherein the drive element includes a plurality of teeth positioned between the outer rotating element and the central rotating element such that when the motor rotates the central rotating element, the plurality of teeth oscillate in a direction perpendicular to an axis about which the central rotating element rotates to thereby cause rotation of the outer element.

18. The stabilizer of claim 17 wherein the motor includes a shaft which connects to the central rotating element, the rotating element of the motor rotates about the axis.

19. The stabilizer of claim 17 wherein the motor includes a rotating element which connects to the central rotating element, the rotating element of the motor rotates about a second axis normal to the axis.

20. The stabilizer of claim 17 further comprising:
   at least one sensor;
   at least one controller in communication with the motor and the at least one sensor, the at least one controller sends signals to the motor to change a position of the fin based on readings from the at least one sensor.

21. A vessel hull stabilizer comprising:
   a housing having a shaft mounted thereto, the shaft configured to connect to a fin such that the fin is located on an outside of the vessel hull and the housing is located on an inside of the vessel hull;
   a drive system mounted to said housing and including a motor and a drive element, the motor connected to a central rotating element of the drive element and an outer rotating element of the drive element connected to the shaft;

wherein the drive element includes a plurality of teeth positioned between the outer rotating element and the central rotating element such that when the motor rotates the central rotating element, the plurality of teeth oscillate in a direction perpendicular to an axis about which the central rotating element rotates to thereby cause rotation of the outer element;

wherein the shaft has a diameter measured at a first location where the shaft meets the housing and the system has a height measured from the first location to a maximum inboard location thereof, the shaft extending outboard from the housing from the first location; and the height is 2-20 times the diameter.

22. The stabilizer of claim 21 wherein the height is 3-15 times the diameter.

23. The stabilizer of claim 21 wherein the height is 3.5-10 times the diameter.

24. The stabilizer of claim 21 wherein the height is 4-7 times the diameter.

25. The stabilizer of claim 21 further comprising upper and lower bearings located in the housing such that the shaft is supported by the upper and lower bearings, the lower bearing positioned closer to a first location where the shaft meets the housing than the upper bearing, a bearing spacing measured between the upper and lower bearings and the stabilizer has a height measured from the first location to a maximum inboard location thereof, the shaft extending outboard from the housing from the first location; and the height is 1.05-8 times the bearing spacing.

26. The stabilizer of claim 25 wherein the height is 1.1-6 times the bearing spacing.

27. The stabilizer of claim 25 wherein the height is 1.2-5 times the bearing spacing.

28. The stabilizer of claim 25 wherein the height is 1.05-3 times the bearing spacing.

29. The stabilizer of claim 21 further comprising:
at least one sensor;
at least one controller in communication with the motors and the at least one sensor, the at least one controller sends signals to the motors to change a position of the fin based on readings from the at least one sensor.

30. The stabilizer of claim 21 wherein the shaft is configured to rotate 360 degrees.

* * * * *